(12) United States Patent
Friesen

(10) Patent No.: US 6,636,863 B1
(45) Date of Patent: Oct. 21, 2003

(54) SYSTEM AND METHOD FOR GENERATING PERSISTENCE ON THE WEB

(76) Inventor: E. Lane Friesen, 34180 Heather Dr., Abbotsford, British Columbia (CA), V2S 1G5

(*) Notice: Subject to any disclaimer, the term of this patent is extended or adjusted under 35 U.S.C. 154(b) by 210 days.

(21) Appl. No.: 09/660,912

(22) Filed: Sep. 13, 2000

Related U.S. Application Data

(60) Provisional application No. 60/153,232, filed on Sep. 13, 1999, and provisional application No. 60/174,709, filed on Jan. 6, 2000.

(51) Int. Cl.[7] .............................. G06F 7/00; G06F 9/44; G09G 5/00
(52) U.S. Cl. ...................... 707/102; 395/650; 395/749; 395/760; 717/118
(58) Field of Search .............................. 707/1–3, 6, 10, 707/102, 500–501.1, 511, 513; 709/1, 100, 200, 202–203; 715/500.1, 511, 513; 717/100, 116, 118, 148

(56) References Cited

U.S. PATENT DOCUMENTS

| | | | | |
|---|---|---|---|---|
| 5,964,836 A | * | 10/1999 | Rowe et al. | 709/221 |
| 6,125,363 A | * | 9/2000 | Buzzeo et al. | 707/100 |
| 6,298,356 B1 | * | 10/2001 | Jawahar et al. | 707/10 |
| 6,305,012 B1 | * | 10/2001 | Beadle et al. | 717/148 |

* cited by examiner

*Primary Examiner*—Alford Kindred
(74) *Attorney, Agent, or Firm*—Jones, Tullar & Cooper, PC

(57) ABSTRACT

Persistence of information and programming from one web page to another is gained by loading an applet or an Active X object repeatedly by addition of applet or Active X object code to the HTML code of a plurality of web pages. The persistence is also spread, beyond the web pages that repeatedly load the said applet or Active X object, by forming a pseudo-constructor with which an object, such as a graphical user interface, is generated by the initial loading and execution of the applet or Active X object, and persists even after the web page which loaded the applet or Active X object has been closed. In an exemplary application of the techniques, a shopping cart is generated that keeps track of the quantity and prices of items selected from a plurality of web pages. The cart operates without any interaction with the host server or other source of the web pages, apart from initial downloading of the applet or Active X object and final presentation of purchased items. Information about available items is also preferably hardcoded into the original HTML page, and not downloaded separately from the server. The techniques can also be used to cache database requests, thus avoiding the need for any server-client interaction beyond a first initial download. For example, this method of caching can be used to store, on the client, optional price updates to the products which are purchased in the shopping cart.

23 Claims, 4 Drawing Sheets

SYSTEM AND METHOD FOR GENERATING PERSISTENCE ON THE WEB

CROSS REFERENCE TO RELATED APPLICATIONS

This application claims the benefit, under 35 USC 119 (e), of U.S. Provisional Application No. 60/153,232, filed Sep. 13, 1999, and U.S. Provisional Application No. 60/174,709, filed Jan. 6, 2000.

BACKGROUND OF THE INVENTION

1. Field of the Invention

The present invention relates, in general, to a system and method for generating programs associated with Internet web pages that can persist from one web page to another without requiring repeated downloading of the programs from a remote server, or the like.

2. Description of the Prior Art

The World Wide Web is generally considered to be largely stateless because one web page cannot transfer information to a page that is outside of its scope, or the scope of its parent. For example, programs or subroutines, such as JAVA applets, that are embedded in the Hyper Text Markup Language (HTML) code for a web page, can only be run in association with that page, and cannot be stored on a user's computer for subsequent use with other web pages. This restriction is currently bypassed, to some extent, in several ways. One way is to use active server pages (ASPs) on the host server that can generate pages dynamically, on the basis of information that persists on the server. For instance, MICROSOFT's INTERNET INFORMATION SERVER can be used to generate active server pages that act as if they have memory. There is no intelligence, however, provided in the browser itself.

As an illustration, consider a "shopping cart" example where items are offered for sale at a store site on the Internet, and a list of items selected by a purchaser (client) is generated as they enter their order. A central computer has a database of the items for sale, and pictures, descriptions and prices for each item. The items are assembled into web pages that are encoded using HTML, as is conventional. In addition, the web pages that display the items are each ASPs, because instructions are contained in these pages that will generate the final HTML page that will be sent to a client who wishes to place an order for one or more of the items. The central computer does processing, according to instructions contained on the ASP, retrieves all of the required elements from databases, and assembles a page that the client computer's browser can read. Thus, the items are stored in the central computer, and central computer processing generates the page. As a result, the pages are usually in the form of grid-like, computer-generated lists.

Suppose the client buys something on a page, by pressing a "button" on the web page. The button sends information to the central computer, which stores that information centrally and then generates another page, indicating what has been purchased. This new page is then downloaded to the client's computer, which displays the new page with its browser. Links are kept open at the central computer that wait for the client to enter additional purchase requests. If another purchase request is received, the central computer generates yet another page that contains the updated purchase information, and once again, downloads this page to the client's computer. Once the client finalizes their order, the central computer collects credit, address and other information from the client to conclude the transaction. Clearly, the foregoing procedure is demanding on the central computer's resources since it requires that the central computer generate and download an updated page each time another item is selected.

Memory can also be maintained on the browser, through what are known as "cookies" that may be used to store name-value pairs on a client's computer. A cookie is a string of up to 2K of name=value pairs, separated by ampersands, such as Product1=jam&Product2=butter &Price1=14&Price2=22.95. These cookies are used by JAVASCRIPT, which is a scripting language contained in HTML. In this technique, a program that is executed on one page tests for the presence of the name-value pairs in memory associated with a browser, and when it finds them, it assumes that they were placed there by some other program on a previous page, and it operates on the information. Each page contains, in its entirety, the code that runs on that page. It must also contain the code to store and to retrieve cookies. This is sometimes done on cheaper shopping carts, usually for very small merchants.

In the shopping cart example, cookies work in the following manner. A merchant's items for sale are located on a normal HTML page. The central computer does no processing, but simply delivers the page. On that page, there can be up to 200 to 300 lines of JAVASCRIPT code. It is meticulously written to display the items for sale, and to store cookies. A purchaser buys something by pressing a button. The code on that page looks to see if there is a cookie that indicates that the purchaser has bought something else previously. If so, the program retrieves the cookie, and displays the total sales, including previously selected items, as well as the currently selected item Then, this information is stored in a revised cookie. Now suppose that the purchaser jumps to the next HTML shopping page. That page has to contain all of the JAVASCRIPT code all over again, because there is no memory of the code from one HTML page to another. As with the previous page, the program then looks to see if there is a cookie, and if there is, it retrieves it and displays the sales from previous pages. Thus, although the use of cookies eliminates the need for the central computer to perform processing of the purchase information through storage of name=value pairs in the browser computer's memory, it is still necessary for each page to contain extensive JAVASCRIPT code, and this tends to place major restrictions on web page design freedom.

Recent browsers, MICROSOFT EXPLORER 4 and 5 in particular, implement Dynamic HTML, which allows the persistence of some variables on the browser. However, neither this limited persistence nor any of the other aforementioned techniques have yet reached the stage at which a particular program can survive from page to page on the browser, without any intervention from the server gathering, remembering and processing information. As a result, anytime the same program is to be utilized with each of a plurality of sequentially downloaded or accessed web pages, the program and any associated data must either be downloaded from the server to the client with each page, or it must remain resident on a server, and interact with each page, thus not only taxing the server's resources, but also substantially slowing the client computer's processing speed.

SUMMARY OF THE INVENTION

The present invention overcomes the drawbacks of the aforementioned techniques through provision of methods by which programs and data associated with web pages are automatically stored in a computer's or other computing device's memory for subsequent use in association with other web pages. This is achieved through use of the inherent characteristics of a software engine, such as JAVA's VIRTUAL MACHINE (JVM), that runs on the computing device, and executes applets and other programs that are embedded in the HTML coding of web pages when they are loaded on the computer. More particularly, the present invention employs first and second techniques by which a program generated object, such as a shopping cart, can be generated by loading of a first web page containing the necessary code for generating the object, and will remain, or appear to remain, generated as additional web pages are loaded on the computer.

In the first technique, program code is added to the HTML of each of a plurality of web pages that is loaded and executed by the software engine to generate the object when a first of the web pages is loaded on the computer. As is conventional in JAVA programming, the program code includes a tag that identifies the program by name and codebase so that if the software engine has already executed the same program during a previous page load, the codebase for the program, which is now resident in the computer's memory but in a suspended or inactive state, will be accessed to reactivate the same program, thereby re-generating the object without reloading the program from the HTML code of the web page.

The key to the first technique is that a number of variables are defined in the program as static variables that can be modified during execution of the program. Static variables in JAVA have the characteristic that they will be remembered by the software engine even if the program is suspended or rendered inactive by loading of another web page. Thus, in a shopping cart example, if the identities, quantities and prices of selected items are defined in the shopping cart program as static variables, whose values can be changed through selection of items from an associated web page, then the values of these variables will remain stored by the JVM in memory along with the rest of the program code when another web page is loaded. If this new web page then also includes a reference or call to the same applet or program, the JVM will reactivate the shopping cart program along with the values of the static variables as they were left in the last page. The result is that through this repeated reactivation of the program and static variables stored in memory by the JVM, the shopping cart can be made to appear as if it continually persists as a purchaser surfs through a group of shopping site web pages. Further, there is no need for the purchaser's or client's computer or other device to communicate with the shopping site server until they are ready to submit their complete order for processing.

Thus, in the shopping cart example, as a purchaser or client selects items from a page, these items are added to the shopping cart, thus modifying the various static variables that define the elements of the cart, such as item ID, quantity and price. When the client now navigates to another web page containing information on additional items for sale, the shopping cart program is temporarily suspended along with the current values of the static variables. However, as soon as the next page is loaded, the JVM detects the applet identification information in the new page's HTML code, and immediately reactivates the shopping cart program along with the static variables as they were last left. This process is repeated over and over as the client surfs from page to page. Once the client is finished with their purchases, the final shopping cart information can be sent along with the client's other necessary identification information to the shopping site's server, which processes the order. It should be noted that with this arrangement, the server is not involved in the processing of the shopping cart information until the purchaser has finalized their order. As a result, substantial server resources are saved.

The second technique is employed to extend the persistence of a program generated object, such as a shopping cart frame or other graphical user interface, even when web pages are loaded in the computer that do not contain any reference to the program which generates the object. In the first embodiment of the invention discussed previously, the program will not be reactivated if the next loaded web page does not contain a reference or call to the program. Thus, the shopping cart will not persist if a client navigates to a web page that is not associated with the shopping site. However, the shopping cart can be made to persist by modifying the program code in such a manner that the JVM or other software engine will execute the applet or program upon loading of an initial web page that contains the applet code, but will de-couple the program from the web page so that the JVM will continue executing the program even when the web page is closed. This is achieved by using an indirect reference in the applet to a separate class that contains all of the necessary code to run the shopping cart or other program. When the applet is executed by the JVM, the shopping cart program contained in the separate class is also executed, but now operates independently of the applet. This is because when a web page is closed or unloaded, any applets referenced in the web page will be suspended or deactivated by the JVM as discussed previously. However, since the separate class was purposely defined not to be in the applet itself, the JVM will continue to run the shopping cart program even after the page has been closed. As a result, the shopping cart will persist even when the client surfs to other web pages that are not related to the shopping site.

In both embodiments of the invention, a number of optional features are preferably employed. For example, execution of the applets or programs can also trigger downloading of a separate database that can be accessed during execution of the program. This arrangement is useful, for example, for downloading price updates that can be accessed by the shopping cart program In addition, each web page can be modified to load different operational parameters with the program so that the program will run differently with different pages, even though the exact same program code is being used.

The foregoing methods thereby eliminate the need for a remote or central server computer to store the program data, and to generate program-containing pages each time a new web page is requested. Unlike the prior art technique of using cookies, the effective memory inherently created by the JVM goes far beyond name=value pairs, and extensive JAVASCRIPT coding on each page is unnecessary. Also, unlike the prior technique of using ASPs, the server is not bogged down with computationally intensive processing, thus freeing up resources. As a result, the shopping cart program or other program can be hosted on a very simple central server, and yet it still has the design freedom of the most expensive machines and sites.

BRIEF DESCRIPTION OF THE DRAWINGS

The features and advantages of the present invention will become apparent from the following detailed description of a number of preferred embodiments thereof; taken in conjunction with the accompanying drawings, in which.

DETAILED DESCRIPTION OF THE PREFERRED EMBODIMENTS

Turning now to a detailed consideration of a number of preferred embodiments of the present invention, one preferred application of the present invention is the generation of a "shopping cart" for use with an Internet shopping site in which a plurality of web pages are available that provide descriptions of items for sale, and enable the items to be selected and added to the purchaser's shopping cart. The shopping cart application will be employed to demonstrate the operation of the preferred embodiments, although it will of course be understood that the techniques of the present invention can be used with any program or application that is run in association with one or more web pages.

Figure 1:
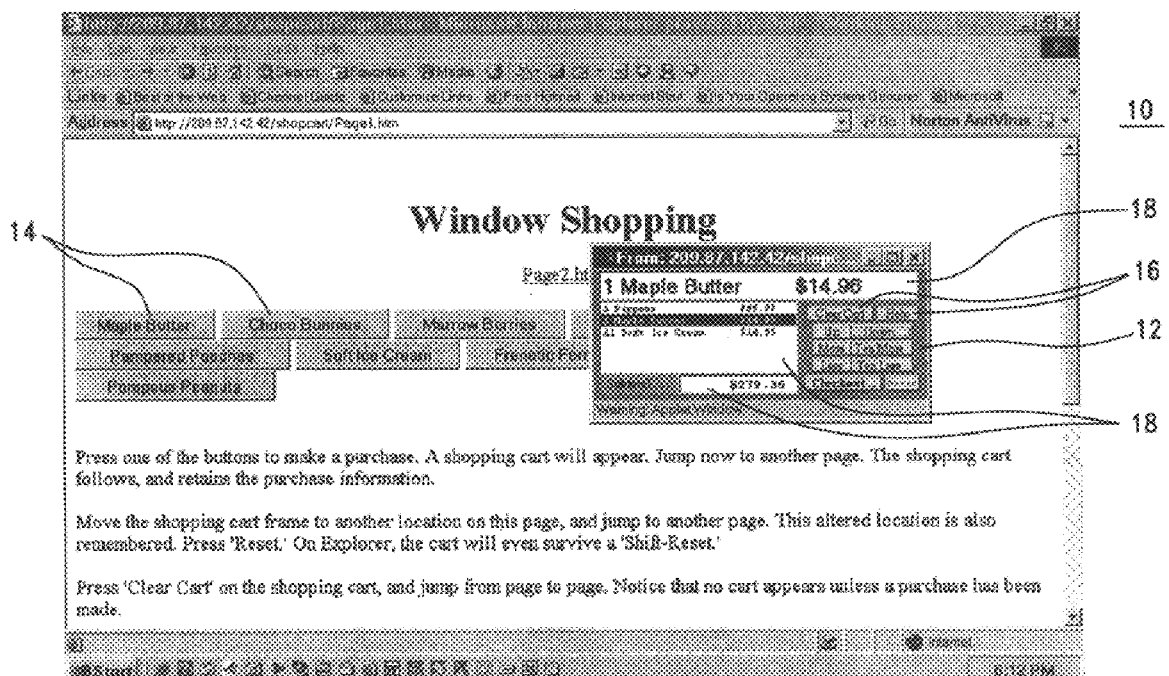
FIG. 1 is a "screen shot" of a web page over which is displayed, a shopping cart frame that is an example of the type of object that can be generated using the techniques of the present invention.

With reference to FIG. 1, a screen shot of a sample web page 10 is illustrated, on which a shopping cart frame 12 is overlaid. The web page 10 includes a plurality of "buttons" 14 that can be actuated with a mouse or other input device, as is conventional, to select any of a number of items for purchase. The shopping cart frame 12 also contains a number of buttons 16 that can be employed for various purposes as illustrated, such as increasing or decreasing the quantity of an item, and submitting a final order for checkout. In addition, the shopping cart frame 12 includes a number of display windows 18 for showing the quantity, identity and price of the selected items, including a subtotal of the current price of the order.

As will be discussed in greater detail later, the shopping cart frame 12 is generated by a program or subroutine, such as a JAVA applet or an Active X object that is run by a software engine, such as JAVA's VIRTUAL MACHINE (JVM), when the web page 10 is loaded onto a computer or other computing device. In accordance with the preferred embodiments of the present invention, the shopping cart program is designed to run in conjunction with a plurality of web pages, without losing track of the selected item information as a purchaser surfs from one web page to another, and without requiring repeated reloading of the program. In addition, in accordance with a second preferred embodiment of the invention, the shopping cart frame 12 can be generated upon loading of a first web page, but will persist as long as the software engine is active, including after the page that triggered generation of the shopping cart frame 12 has been closed or exited. The program that generates the shopping cart frame 12 thus runs independently of the web page, thus enabling a purchaser to make further modifications to their order through activation of the frame buttons 16, even after they have navigated to other web pages that are not even associated with the shopping site.

Figure 2:
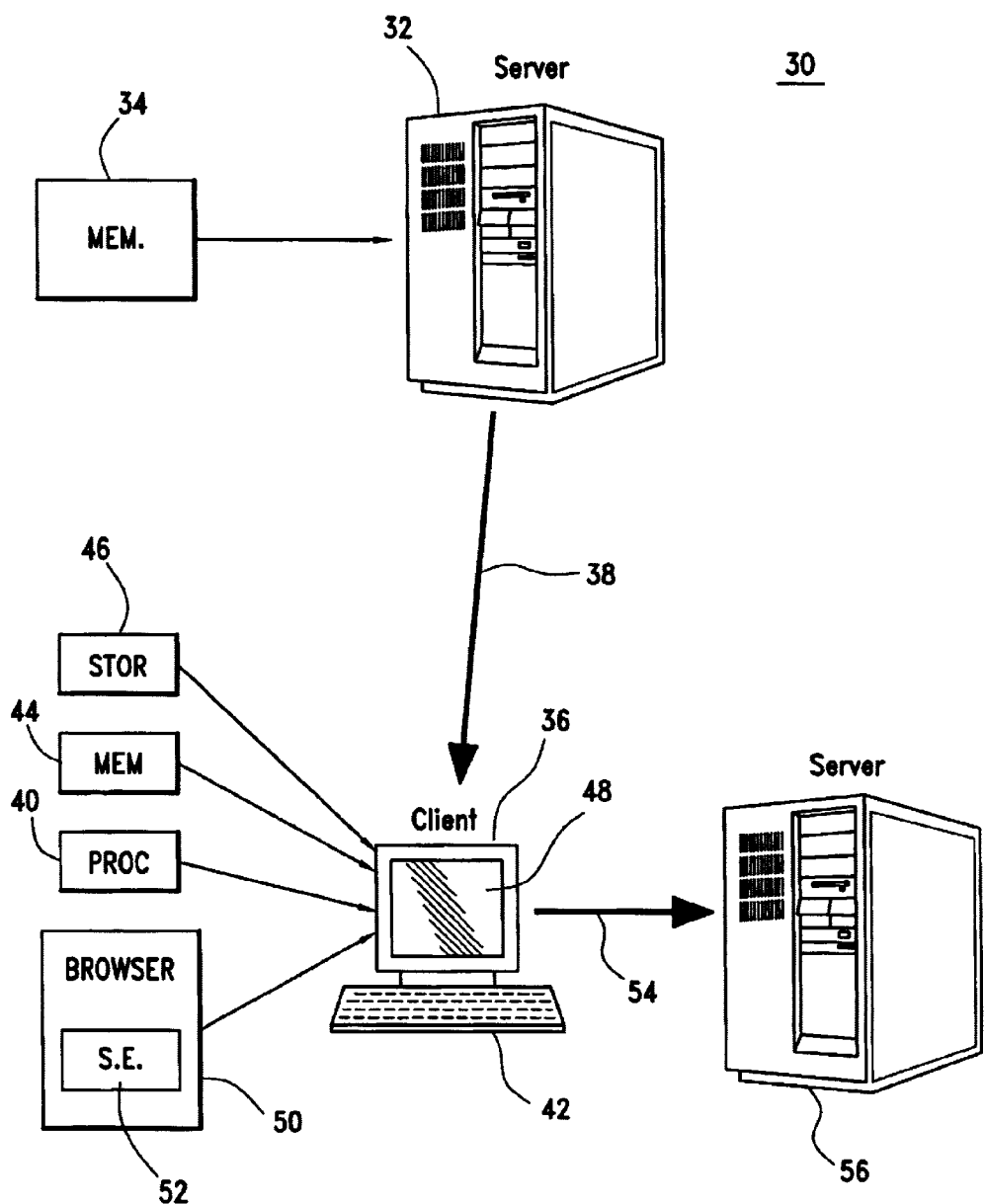
FIG. 2 is a schematic diagram of a computer system that can be employed to implement the preferred embodiments of the present invention.

FIG. 2 shows a networked computer system 30 that can be configured to implement the preferred embodiments of the invention. The computer system 30 includes a first server 32 that serves as a first source of web pages. It should be understood, that while the server 32 is typically a remotely located computer that communicates with other computers or devices via the Internet, the server 32 can also be a local storage means, such as a hard drive, CD-ROM, etc., silo and can be accessed through other than the Internet, such as through an Intranet or LAN.

The server 32 includes a memory 34 that contains a plurality of HTML encoded web pages, and at least a first directory for storing programs, such as JAVA applets and Active X objects that are referenced by the web pages. In addition, the memory 34 can store databases that can be downloaded in conjunction with the execution of the programs, such as price update databases in the shopping cart application, for example.

A client computer workstation 36, such as a PC or the like, is provided that receives information from the server 32 through a communications link 38. The workstation 36 includes, as is conventional, a processor 40, a keyboard and/or other input devices 42, an operating memory 44 (i.e., RAM), a storage device 46, such as a hard drive or CD-ROM, and a video display monitor 48. In a preferred embodiment of the invention specifically for use in accessing web pages from the Internet, a browser application 50 is loaded in the memory 44 for facilitating loading and viewing of HTML web pages. As is also conventional, the browser application 50 incorporates a software engine 52, such as JVM, that interprets and runs applets, Active X objects, and other programs that are referenced in one or more loaded web pages.

It should be understood that the computer workstation 36 could be replaced by any other suitable computing device if desired. The only requirement is that the device includes some means for loading web pages, and a software engine for executing programs associated with the web pages. Examples of such alternative devices include basic Internet communications terminals, JAVA chips, and other devices that can interface to the Internet or to an Intranet, such as cell phones, PALM PILOTs, etc.

In the shopping cart implementation of the preferred embodiments, the operator of the workstation 36 sends information, when the operator wishes to finalize a purchase, through a second communications link 54 to a central server 56 for processing. This arrangement avoids the need to send substantial amounts of data in two directions through the communications links 38 and 54. It should be understood, however, that the first server 32 could be used for order processing as well.

To implement the preferred embodiments of the present invention, all that needs to be done is that the HTML code for one or more web pages be modified with additional lines of code. In an example designed specifically for generating a shopping cart with JAVA applets and JAVA's Virtual Machine, the <BODY> tag in any HTML web page or document in which persistence is required is replaced by the following lines of code:

```
<BODY onLoad="v( )">
<APPLET code=app.class height=1 width=1 id=app name=app archive="app.zip"></APPLET>
<SCRIPT LANGUAGE=javascript>
    function buy(a,b,c,d){document.app.prod(a,b,c,d)}
    function v( ){document.app.set Version(new String(navigator.appName),new String(navigator.appVersion))}
</SCRIPT>
```

The inclusion of this 'boilerplate code' into an HTML page alters it completely into something which has memory, maintains a shopping cart, and has access to a database cache. The shopping cart itself detaches from the launching HTML page, and operates for as long as the browser is active. This occurs without any interaction with the server 32, beyond the initial loading of the HTML web page or document and its associated applet.

The reason that the persistence works is because JAVA applets are in an active state for as long as the HTML page in which they are loaded is on the browser screen. When a jump is made to another page, then the applets that were loaded on the previous page become inactive. However, unless there is a shortage of memory, they are not unloaded. Whenever the browser returns to an applet's page, then the particular applet for that page is not usually reloaded, but rather it is changed from an inactive or suspended state back again to an active state. Static variables that were set in a previous active stage are remembered during times of inactivity, and can be accessed when an applet again becomes active. Now, if a page loads an applet with the same name as one that was loaded by a previous page, and if this involves a relative (in contrast to an absolute) call to the same codebase, then the applet for the previous page becomes active again—just as if it had been called by the previous page. A new instance of the applet is not usually loaded. This feature can therefore be used to store information between HTML pages.

An applet, however, contains program code as well as variables. Persistent processing can therefore be carried out on the persistent memory. A program can thus be written that appears to live on from page to page—it is continually being altered from an active to an inactive and then again to an active state and given access to its previous memory.

If an applet with the same name but a different codebase is loaded, then, for security reasons, it is assigned a new address space. The same shopping cart code, even when it is run simultaneously on separate commercial sites from the same browser, can therefore develop and maintain distinct shopping carts for the separate merchants.

If an HTML document in a subdirectory of a site wishes to participate in the persistence, then it is sufficient to add the line CODEBASE= . . . to the APPLET tag. This technique can be extended throughout a directory and subdirectory structure, so that persistence spreads freely throughout any given site. Alternatively, it is often possible to access the applet absolutely, as in CODEBASE=http://www.myserver/myAppletDirectory as long as the applet and the HTML pages are located on the same server. This absolute call is then treated as relative. The boilerplate code now becomes independent of directories and sub-directories.

Since Active X as implemented in MICROSOFT's Dynamic HTML is based in the JAVA language, it turns out that it can also generate persistence. The applet has in fact been successfully ported to an Active X object. The 'boilerplate code,' in the previous section, may thus be altered so that it is an <OBJECT> that is loaded rather than an <APPLET>With a few minor adjustments, there is the same functionality.

The applet or object that is continually being reloaded does not need to be entirely identical from page to page. In particular, it may have different parameters, as expressed in varying <PARAM> tags under the <APPLET> tag. Clever use of this freedom with parameters can enable massive changes in the classes that are instantiated from one page to the next, and thus generate genuine alterations in the code itself. The program can vary in ways that would never be possible if it were not being continually reincarnated. Alternatively, Boolean variables can be set or cleared in the applet code which also determine ways in which the applet or Active X object re-incarnates itself.

Since persistence is linked to the JVM, and not to the HTML, it is not necessary to load an applet or object into every page of a site in order to gain persistence. It is enough to load the applet or object into those pages in which access to the accumulated information is necessary. Browser mechanisms, and the functionality of JAVA, make sure that the information is maintained—for as long as memory permits—until it is needed, even through extended access to pages or sites which know nothing about the applet or object.

Of course, if the applet is inactive, and memory is needed for other JAVA programming, then the virtual machine will overwrite the program. There is room, therefore, for only a limited number of programs that use this technique.

It should also be noted that persistence of memory throughout other pages or sites is not a security issue because an applet or Active X object is resurrected—or made accessible to other programs—only if it resides at the same codebase, or at some relative offset.

The second method for developing persistence between HTML pages will now be discussed. If one looks at abstract classes in JAVA, one notices that they are tied very closely to the JAVA virtual machine. If they could be instantiated, then certainly they would persist—programs could then be remembered along with data, even when the applet was inactive. However, abstract classes cannot contain constructors. Suppose, however, that applet code is composed solely of pointers to static variables defined in some abstract class. Suppose further that static components for a frame (buttons, etc.), as well as the static name of the frame itself, are also defined in the abstract class. Then, suppose that unit( ) in the applet calls a static function in the abstract class which instantiates the static frame and assigns the static components to it. It then sets a flag in the abstract class that tells it not to do this again. One now has a kind of pseudo-constructor for the abstract class. The resulting frame, and its components, are tied, through the abstract class, to the JVM itself, and they persist from HTML page to HTML page, even when the applet is not being loaded. The applet that originally launched both the frame and the abstract class may itself move back and forth from an active to an inactive state, but this makes no difference to the frame itself, for it is no longer dependent upon the applet. It turns out that if one uses the same kind of pseudo-constructor in a normal (not abstract).class, then one will also generate a frame which breaks free of the launching site and persists indefinitely.

Now, how are events enabled within this 'terminate and stay resident' frame—so that it will carry out actions when 'off site'? It is done in the following manner. Events must be caught in the frame itself, but all variables and interrupt methods are contained as static variables and static methods in the abstract class. The frame event handlers simply make jumps to these static variables and methods. A program has thus been created that lives beyond the page in which it was launched, remembers data that is collected from page to page for as long as a page accesses the launching applet through a relative call, and carries out event handling within the frame itself on applet data, when off-site.

Figure 3:
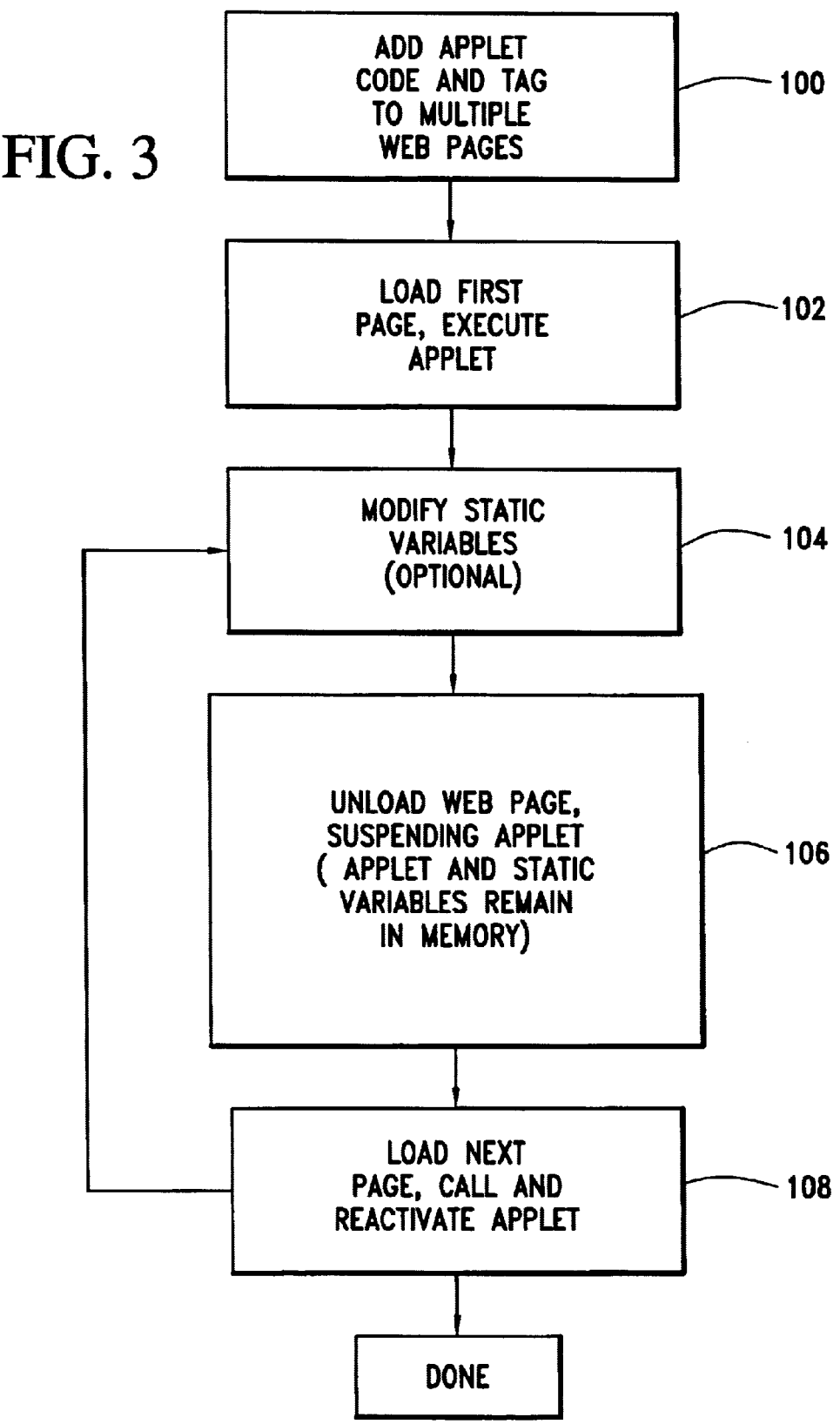
FIG. 3 is a flow chart illustrating the overall steps that are employed in a first preferred embodiment of the invention to repeatedly reactivate a program associated with a plurality of web pages.
Figure 4:
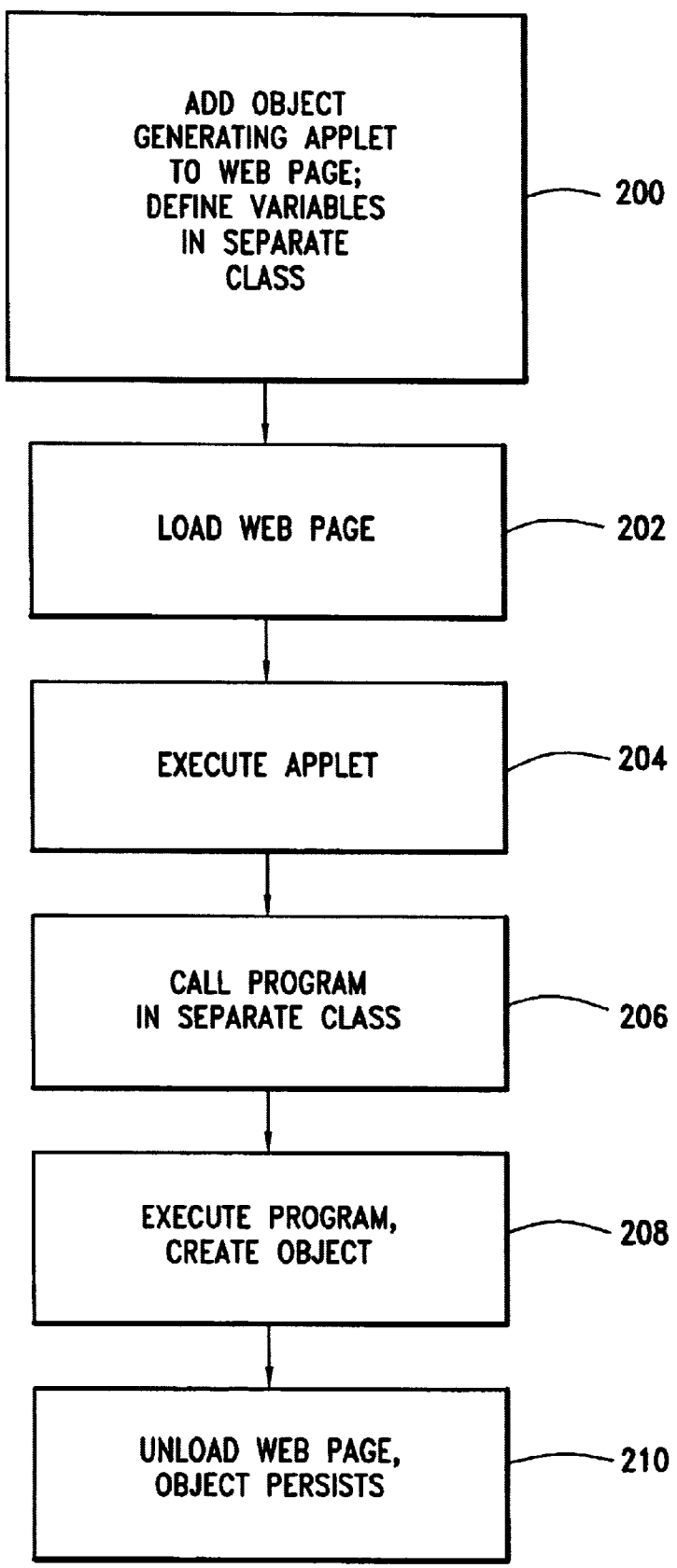
FIG. 4 is a flow chart illustrating the overall steps that are employed in a second preferred embodiment of the invention to generate a program object that is associated with one or more web pages, but is designed to remain active after the web pages are no longer loaded in a computer or other computing device on which the present invention is implemented.

The flow charts in FIGS. 3 and 4 summarize the two foregoing techniques for creating persistence of a program object, such as the shopping cart frame 12 in FIG. 1, as multiple web pages are loaded by a browser application, or the like. With reference first to FIG. 3, the first step 100 for implementing the first embodiment, wherein the same applet is repeatedly reactivated, is to add applet code and an identification tag to the HTML of each of a plurality of web pages. Next, at step 102, a first of the web pages is loaded into a computing device, and the program is executed by the software engine. At step 104, the static variables are modified, if desired, and the web page is exited at step 106, thus suspending activation of the program and maintaining the program and the static variables in the computing device's memory. Next, at step 108, a second of the web pages is loaded, and the program is reactivated, by virtue of the program identification information in the HTML code of the web page, with the previous values of the static variables intact. Steps 104, 106 and 108 are then repeated for each subsequent loading of additional ones of the web pages.

With reference to FIG. 4, the second embodiment of the invention also starts with the addition of the object generating code at step 200 to at least one web page that will initiate generation of the object. In this instance, all of the static variables that are employed to generate the object, are defined in a class, e.g., abstract class, that is referenced by the applet, but not actually contained in the applet itself. Upon loading of the web page at step 202, the software engine executes the applet at step 204. This in turn creates a call at step 206 to the class containing the object generating program, which thus causes execution of the program and generation of the object at step 208. Next, at step 210, the web page is unloaded, thus terminating execution of the applet, but the object generating program continues to run because it operates independently of the applet.

Returning now to the shopping cart example, a non-commercial site is altered into a commercial site through the inclusion of the 'boilerplate code' into the HTML of all pages that wish to present items for sale. A specific item is then offered for sale by including an onClick="buy ('itemiD','itemName','itemPrice', 'itemShippingProcedures')" event handler into any page object which is able to support it—this may be a button, a diagram, some region of an image, or even a JavaScript program When the client operator triggers an event in this object on his browser, a call is made by the event handler to the applet or object which was loaded into the page, and the applet or object adds the item to a shopping cart frame or form which this applet or object brings up whenever a sale is made. None of this involves any interaction whatsoever with the host server.

When the 'buy' event is triggered by the browser operator, the applet or object checks to see whether an item with 'itemID' is located in a cached database on the browser. If it is, then it assigns the associated cached price to the object, and displays this in the shopping cart frame or form. If it is not, then it uses the number that is hardcoded into the HTML as 'itemPrice.' Again, this involves no interaction with the host server. The fact that everything occurs on the client, and can use the full power of the client's processor, means that database access involves no noticeable delay, even when the database is quite large. The 'itemID' is the key and must always be present. The 'itemPrice' may be an empty string. When it is, then the database must always be present, and it must contain 'itemID' and a corresponding 'itemPrice.'

The database in this implementation can be designed with MICROSOFT ACCESS, and can thus be integrated into any large-scale database. It is a two-column table in text format, and can thus also be designed by a novice operator using a simple text editor. To be recognized by the applet or object, the database in this implementation must be stored on the merchant's server in the same directory as the applet or object, and it must be called 'update.txt.' When the applet or object is first loaded by some particular page, it checks for the presence of this file in its codebase directory. If the file is found, then the applet or object loads it, and it then generates a cache, on the client, for subsequent pages. In this implementation, this cache is a static String in an abstract JAVA class, and it persists. The string may be well in excess of 1 Meg in length, and could thus include more than 40,000 revisions. If the database file is absent, the applet or object remembers this as well—in our case as an altered Boolean variable in the JAVA code. No further server-client interaction is attempted, or necessary.

Once 'itemPrice' has been checked with the (optional) database, which is cached on the client, then the applet or object, which also resides on the client, places the result in a frame or form on the desktop window. Sales information, as it accumulates, is stored as a static Vector in the JAVA code, and it persists. The result of the purchase can therefore be collated with prior purchases, and a running total developed and displayed.

Since cumulative sales information has persistence, it is possible to alter previous purchases without going back to the pages on which they were presented, and without interacting in any way with the host server. For example, referencing again FIG. 1 and the buttons 16 in the shopping cart frame 12, the 'UP' and 'DOWN' buttons allow scrolling through the list of purchases, and the 'MORE' and 'LESS' buttons allow prior purchasing decisions to be altered.

If 'CLEARCART' is pressed, then, in one version of the implementation, the purchase Silo buffer is cleared, this persists, and the applet or object, in its next incarnation, chooses to bring up only a stub of itself. Full instantiation of the purchase frame or form occurs only when a purchase is made, and for as long as there are items in the purchase buffer. Since applet or object code is itself cached by most browsers, in a separate memory area, this means that there is essentially no 'overhead' involved in carrying the applet or object stub from one page to the next—navigation is rapid, with no noticeable delay.

Another version of the implementation generates a frame which is linked to an abstract class, and thus independent of the applet and the particular HTML page. 'CLEARCART' in this implementation simply makes the frame invisible. There is now no additional delay whatsoever between HTML pages, for one is dealing with transitions between active and inactive of an applet stub which is less than 1 K in size.

When the client operator is ready to finalize his purchases, then, in a preferred implementation, he presses 'CHECKOUT . . . ' This sends the purchase information, as name-value pairs appended to a hard-coded HTTP address, to a central server that is equipped to ask for name, address, and credit-card information. The codebase of the applet or object is also included —this is used to check that the merchant's site has registered with the central server, and that it is authorized to do business.

In one implementation of CHECKOUT . . . ', the program which is linked to the abstract class breaks into the JAVA-SCRIPT interpreter—it does not matter which HTML page is presently loaded—and jumps to the central server location. 'CHECKOUT . . . ' can therefore be carried out from anywhere. 'HELP' becomes 'HOME', and jumps to the merchant's home site. However, this implementation requires the use of MAYSCRIPT in the applet load, as well as JSObject classes. Another version supports a 'CHECKOUT . . . ' only from the merchant's home site—this requires a lower security clearance, and appears to be universally enabled. When the 'CHECKOUT . . . ' button is pressed, the cart is automatically cleared. Pressing 'RESET', however, brings the information back, in case the user wishes to change his mind.

In the preferred implementation, one of the fields in the 'onClick=buy(a,b,c,d)' event handler is a string that encodes every possible variation of tax and shipping instructions. This information is passed, when a purchase is made, to the applet or object, which in turn passes it through unaltered to a central server, when the order is finalized, and the central server processes the order accordingly.

With reference now to specific code examples that will implement the embodiments of the invention, the following code will place a frame on a web page, and then save its position as it is moved, so that it appears at the altered position when a new page is loaded. This demonstrates persistence.

1. An Applet Example

Compiling this code will generate the two files Applet1.class and Constants.class.

Place the following code in HTML Page 1:

```
<HTML>
<HEAD>
</HEAD>
<BODY>
    <applet code=Applet1.class name=Applet1 width=1
    height=1> </applet>
<A HREF="Page2.htm">Page2.htm</A>
</BODY>
</HTML>
```

Place the following code in HTML Page 2:

```
<HTML>
<HEAD>
<TITLE></TITLE>
</HEAD>
<BODY>
    <applet code =Applet1.class name=Applet1 width=1
    height=1 id=Applet1> </applet>
<A HREF="Page1.htm">Page1.htm</A>
</BODY>
</HTML>
```

When the applet is loaded, method init( ) is called. This creates a frame, and places it at the (x,y) position defined by variables framex and framey. A look at class Constants tells us that these are initialized at 225 and 150 respectively. Suppose that while Page1 is up, the user moves the frame. Method stop( ) is called automatically when Page1 is left by the user, and this determines the (x,y) position to which the frame was moved by the user, and remembers it by changing

```
import java.awt*;
import java.applet.*;
public class Applet1 extends Applet{
    public void init( ){
        if(Contstants.frame = null){
            Consants.frame = new Frame( ),
            Constants.frame.reshape((int)Consants.framex.intValue( ),(int)Constants.framey.intValue( ),300,300);
        }
        Constants.frame.show( );
    }
    public void stop( ){
        Constants.framex = new Integer(Constants.frame.bounds( ).x);
        Constants.framey = new Integer(Constants.frame.bounds( ).y);
        Constants.frame dispose( );
        Consants.frame = null;
        }
}
abstract class Constants{
    static Frame frame;
    static Integer framex = new Integer(225);
    satic Integer framey = new Integer(150);
}
``` variables framex and framey. When the page is reloaded, method init( ) is called again. It seems obvious that the frame should be placed again at coordinates (225,150), as defined in class Constants. That is the curious thing, however. The values of variables framex and framey, when a reload occurs, are those set by method stop( ) when the previous page was left. The initialization in class Constants is ignored by a reload. Why? The program is not being restarted; it is simply being re-activated. That is the essence of persistence as generated by applet reloading.

There will be stability problems with the frame in some browsers. This is associated with the Abstract Windows Toolkit, and is not linked to persistence. The instability is present even when the applet is not being continually reloaded, and is caused by the fact that the applet must interact with a peer, which does the actual work of constructing the frame. The instability is removed in three ways: the first is to adjust the order of frame operations so as to minimize pressure on the peer. The second is to follow every frame operation with a call to pack( ). This appears to place a modal stop on further execution until the peer has completed its task. The third is to introduce delay loops at critical points. For instance, one might define the method pause (200), in which pause(time) is defined as follows:

```
void pause(int time){
  long startTime = System.currentTimeMillis( );
  while(System.currentTimeMillis( ) <startTime + time){
    //infinite loop:time slicing creates a pause to give the peer an
    opportunity to finish
  }
}
```

Notice in the applet code that the frame name is defined in the abstract class Constants. This is absolutely essential for stability. Notice also that the class Constants is never instantiated.

2. An Active X Example

```
import com.ms.wfc.html.*;
import com.ms.wfc.ui.*;
public class Class1 estends DhDocument{
    public Class1( ) {
       if(Constants.form = null){
       Constants.form = new Form ();
       Constants.form.setBounds((int)Constants.formx.int Value( ),(in)(Constants.formy.intValue( )),300,300);
       Constants.form.set Visible(true);
       }
    Constants.form.bringToFront( );
}
public void dispose( ) {
    Constants.formx = new Integer(Constants.form.getBounds( ).x);
    Constants.formy = new Integer(Constants.form.getBounds( ).y);
    Consants.form.dispose( );
    Constants.form = null;
    super.dispose( );
    }
}
absract class Constants{
    static Form form;
    static Integer formx = new Integer(225);
    static Integer formy = new Integer(150);
}
```

This code is interpreted by Microsoft Visual J++ Version 6, and used to form an Active X object which will be loaded by the following two HTML pages. The first, or something similar to it, is generated automatically by the Visual J++ compiler and saved as HTML Page 1.htm. Notice that we have inserted, into the automatically generated code, a hyperlink to a Page2.htm.

```
<HTML>
<HEAD>
<TITLE></TITLE>
</HEAD>
<BODY>
<OBJECT classid="java:com.ms.wfc.html.DhModule"
    height=0 width=0 . . . VIEWASTEXT id=OBJECT1>
<PARAM NAME=_CODECLASS VALUE=Class1>
<PARAM NAME=CABBASE VALUE=Project3.CAB>
</OBJECT>
<A HREF="Page2.htm">Page2.htm</A>
</BODY>
</HTML>
```

Page2.htm is produced by copying the contents of Page1.htm into an empty HTML page, naming this said page Page2.htm, and altering the hyperlink to Page2.htm, in the said copied code from Page 1.htm, into a return link to Page1.htmn:

```
<HTML>
<HEAD>
<TITLE></TITLE>
</HEAD>
<BODY>
<OBJECT classid="java:com.ms.wfc.html.DhModule"
    height=0 width=0 . . . VIEWASTEXT id=OBJECT1>
<PARAM NAME=_CODECLASS VALUE=Class1>
<PARAM NAME=CABBASE VALUE=Project3.CAB>
</OBJECT>
<A HREF="Page1.htm">Page1.htm</A>
</BODY>
</HTML>
```

In contrast to the applet example, which uses the Abstract Windows Toolkit, there appears to e no stability problem at all in the Active X implementation of persistence, which uses Windows Foundation Classes. This demonstrates graphically that persistence can be used to generate very dependable code.

The previous two examples can be tested in the following manner. 1) Place all relevant files into the same directory. 2) Load Page 1 into a browser. 3) Use the mouse to move the frame (or in the case of Active X, the form) to a different location. 4) Use the browser to jump to Page 2. Notice that the frame does not come up in the original location but rather retains its new position. 5) Use the browser to jump to an unrelated page and then reload either Page 1 or Page 2. You will notice that the frame returns and maintains its latest position. 6) Repeat steps 3) to 5) as often as you wish.

3. A Pseudo-Constructor Example

Create the following applet:

```
import java.applet.*;
public class app extends Applet{
    public void init( ){
        ShopPanel.init( );
    }
}
import java.awt.*;
import java.awt.event.*;
public class ShopFrame extends Frame implements ActionListener{
    void formPanel( )    {
        add(ShopPanel.counter);
        ShopPanel.counter.addActionListener(this);
    }
    public void actionPerformed(ActionEvent e){
        ShopPanel.increment( );
    }
}
import java.awt.*;
public class ShopPanel{
    static ShopFrame ShopFrame = new ShopFrame( );
    static Button counter = new Button("Click");
    static int r = 0;
    static void formPanelElements( ){
        shopFrame.setBounds(200,200,100,100);
    }
    static void init( ){
        formPanelElements( );
        shopFrame.formPanel( );
        shopFrame.show( );
    }
    static void increment ( ){
        counter.setLabel(new Integer(r).toString( ));
        r++;
    }
}
```

Place it into the following HTML page:

```
<HTML>
<HEAD>
</HEAD>
<BODY>
    <applet code=app.class name=app width=1 height=1
    VIEWASTEXT></applet>
</BODY>
</HTML>
```

Notice, in this code, that neither applet 'app' nor Frame 'ShopFrame' contains any variables at all. All variables are contained in the class ShopPanel. The applet, in its method init( ), refers to ShopPanel, which in and of itself forces all of ShopPanel's declared variables, all of which here are static, to be instantiated. In particular, shopFrame and counter are formed. The applet's life cycle then calls init( ) in the applet, which transfers the call to init( ) in ShopPanel. ShopPanel's init( ) calls formPaneElements( ) in ShopPanel, which sets the characteristics of the already instantiated objects in ShopPanel. The next call is to shopFrame, which now exists, and has defined characteristics, and in particular to its method formPanel( ), which takes the frame elements defined in ShopPanel, and sets them into shopFrame, which is also defined in ShopPanel. Event handling can now be set up, in shopFrame's formPanel( ). Events are caught in shopFrame, but the event handlers are all located as static methods in ShopPanel. Notice that this structure is not dependent upon the applet at all—there is a call from 'app' to ShopPanel, but nothing from ShopPanel back to applet 'app'. The frame shopFrame, which is created indirectly by the applet through its reference to ShopPanel, in fact knows absolutely nothing about its parent—it is aware only of the class ShopPanel, which is not being instantiated. When page transfers are made, it is the applet which is altered from active to inactive—notice how short it is, and how little time will be required to reload it. The frame doesn't change at all; it simply sits there, and watches as you browse.

Let's look now at what our example does. The applet indirectly creates a frame. Clicking this frame increments a number (there may be problems in some browsers—we are not including minor tweaking elements, composed solely of standard JAVA, that solve these 'glitches'). Moving away from the HTML page does not destroy the frame—rather, it continues to operate as a kind of 'terminate and stay resident' web program. Notice that the frame now maintains its position from page to page automatically, without any user intervention, unlike the previous two examples. This is because it is independent of what happens to the pages—when created it is tied to the JAVA virtual machine, through the static variables, and then never destroyed. This demonstrates that we have moved a stage further in establishing persistence. Since the frame is only created once, there are none of the stability problems that were previously associated with the Abstract Windows Toolkit. Transition between pages is essentially instantaneous; whenever access to the underlying HTML is desired, then the very small source applet is simply reloaded on that page. It provides the link to ShopPanel, from the underlying HTML.

Incidentally, if you look closely, you will notice that ShopPanel this time is not an abstract class. A pseudo-constructor for an abstract class must follow a very specific initialization procedure in order to work. It turns out that if the same sequence is followed within a normal class—using the same static variables and static methods—then this also leads to an object that 'lives forever.' However, a normal class can contain a constructor, and thus it can do more things.

The two methods for creating persistence (reloading and pseudo-constructors) cooperate beautifully. The shopping cart, for instance, is created once, and then never destroyed. Applet reload gives it continuing access to the underlying HTML, through JAVASCRIPT and LiveConnect, and through the applet lifecycle, which can pass current context information to the persistent class. Creation of the shopping cart can occur on any of the pages that are being reloaded—one simply sets a Boolean variable 'firstTime' to true in the initialization statements in ShopPanel, and when the frame is created, one resets it to false. The change in the variable is remembered at a reload; the frame is created only when 'firstTime' is true.

Returning once again to FIG. 2, the shopping cart embodiment of the present invention preferably operates in the following manner. At least some of the web pages in the server 32 each contain a relative call to applet app.class, located in a first directory on the server 32. The applet app.class in turn calls Constants.class, which is located in the same directory. Other pages are normal HTML pages, and thus contain no calls to the applet app.class. The pages which do contain the call to app.class may be in any directory on the server 32 which is able to access the first directory through a relative call. The first directory may also contain a file called update.txt. This file, when it is present, constitutes the database.

The workstation 36 receives information from the server 32 through the link 38. This link is essentially one-way. No data is ever sent from the workstation 36 to the server 32, other than a periodic call, initiated by the operator of the workstation 36, for page downloads, and a one-time attempt by the applet app.class to download the file update.txt. As indicated previously, the presence or absence of the file update.txt determines whether app.class operates with or without a database.

In the shopping cart implementation of this invention, the operator of the workstation 36 sends information, when the operator wishes to finalize a purchase, through the second link 54 to the central server 56. Shopping cart information, stored in the workstation 36, is cleared when the data is sent through the link 54 to the central server 56. This ensures that link 54, like link 38, is essentially a one-way link—its precise nature is described in the next paragraph.

As soon as the central server 56 has received sales information, then normal order processing takes place between the central server 56 and the workstation 36. This order processing is outside the scope of this invention. For instance, the central server 56 may send the workstation 36 a summary of his purchases, and ask for name, address, and credit card information. The workstation 36 may change his mind at this point, press 'RESET', restore the information in the cart, alter it, and resubmit. This still does not involve the central server 56. The previous page sent from the central server 56 is simply ignored, and responses are now made to the second page. It is in this precise fashion that the second link 54 is to be a one-way link.

Now consider the exact nature of persistence. In particular, the process of storing, altering and retrieving a string variable will be considered. Suppose that the workstation 36 sends a request to the server 32 for a first page, Page 1. This page contains a call to launch app.class which resides in the first directory on the server 32. The file app.class, in response to this call, will be downloaded from the server 32 to the workstation 36, along with the classes, also residing in the first directory, to which the applet app.class refers. These must include at least one abstract class, which will be referred to as Constants.class.

Let Constants.class contain the following global declaration: static String s="Hello";. In the general case, it is also possible to have the statement static String s; . Both options will work.

The normal lifestyle of an applet determines that method start( ) in the applet app.class will be executed on the workstation 36 once the applet app.class has been fully loaded. Let this method contain the following line of code: String test=Constants.s; . If variable test is checked, it will be seen to contain the value "Hello."

Suppose that an event occurs on the workstation 36 whose handler contains the following code: Constants.s="Bye";. Executing the code String test=Constants.s will show that the variable test now contains the value "Bye," just as one would expect.

Now suppose that the workstation 36 downloads a second page, Page 2 from the server 32. Page 2 may reside in a different directory than Page 1—it is essential only that it refer to app.class in the first directory through a relative address. (If the applet app.class is not referenced in the proper manner, then the call will set up a separate source of persistence. This can be a desired feature.) Page 2 may download the applet app.class directly from the server 32, or it may load it indirectly from a browser cache on the workstation 36—it does not matter.

As before, the abstract class Constants.class will be loaded with its global declaration static String s="Hello";. However, if the code String test =Constants.s is now executed and the variable test is checked, it will be found to contain the string "Bye" and not "Hello." Thus, the change in the value has persisted from Page 1 to Page 2. This demonstrates the essential characteristic of persistence.

Now suppose that the workstation 36 downloads an HTML page which contains no code related to the applet app.class. The page may be located on the server 32, or it may be located on a totally different server. Next, suppose that either Page 1 or Page 2 is reloaded. If the code String test=Constants.s is executed and the variable test is displayed, it will still contain the value "Bye." This persistence will continue either until the browser on the workstation 36 is closed, or until a number of pages with many JAVA applets are loaded. Notice again that there is no return traffic from the workstation 36 back to the server 32. Only requests for downloading information are passed from the workstation 36 to the server 32.

Now consider the preferred implementation of this invention as a shopping cart. Suppose that Page 1 wishes to offer an item for sale. This is done by inserting the event handler onClick ="buy('itemID','itemName','itemPrice','itemShippingProcedures')" into some object contained in Page 1. The strings in the event handler describe the item that is being sold. For instance, the event handler could have the form onClick="buy('32','Maple Butter','$43.29','By Express Mail with tax')", or possibly, onClick="buy ('A23C9', 'French Horn','$5,200','17')". Note that the workstation 36 does not ask the server 32 what is for sale, and app.class itself contains no information about what is for sale. Instead, the specific information is hardcoded into Page 1, Page 2, and so on.

In the shopping cart implementation, the class Constants.class, which resides on the server 32 and was downloaded to the workstation 36, is expanded to include a Vector class which holds the sales information presented by the event handler. Each item that is purchased is allocated five fields in this one-dimensional Vector array—item ID, number of items purchased, item description, item price, and shipping instructions. The Vector class is defined in Constants.class through the statement Vector products=new Vector(100);. This allocates enough memory for 20 items. If more products are purchased, this Vector will automatically expand.

When the shopper clicks the page object with its associated event handler, then the method prod( ) is called in the applet app.class, which inserts the four string values contained in the onClick event handler, contained in Page A1, into the Vector in the class Constants.class, along with another string element containing the number of that item which is being bought.

For efficiency, the method start( ) in one version of the applet app.class, called automatically by the browser when Page A1 is loaded, will only instantiate the shopping cart frame when it sees that the size of the sales Vector in the class Constants.class is greater than zero. The state of this Vector is maintained by persistence. If the method prod( ) in the applet app.class, which method is called when there is a purchase, sees that the size of the sales Vector is zero, then it begins its processing by instantiating the shopping cart frame. This refusal to instantiate the frame until necessary ensures optimal page access times. (This method of loading only an applet stub when there are no purchases works on every browser except INTERNET EXPLORER 3, which must be treated differently.)

Alternatively, the shopping cart frame is instantiated immediately, but through an abstract class and a pseudo-constructor. The frame then remains active at all times, and becomes independent of the page—this means no delay time whatsoever between HTML accesses. As appropriate, the program simply switches the persistent frame between a visible and an invisible state.

The shopping cart frame also contains buttons which allow the operator of the workstation 36 to modify the number of items being purchased. Each time a change is made, an appropriate method in the dependent class Constants.class, is called. The shopping cart frame is updated appropriately. As the client continues to browse, persistence of data is maintained through the Vector class. The frame remains visible—in one implementation because it is re-instantiated after every page transfer, in the other because of the initial use of pseudo-constructors.

One of the buttons on the shopping cart frame provides an option to order the items currently selected. When this button is clicked, then the dependent class Constants.class, initiates a jump from the workstation 36 to the central server 56. The information in the Vector class is appended as name-value pairs to the HTTP address of the central server 56—to a maximum of 900 bytes of information, which is all that is allowed by the JAVA Virtual Machine—and the sales Vector is cleared correspondingly. Included with the information in the HTTP address is the codebase of the applet app.class on the server 32, which is used by the central server 56 to identify the site of the merchant.

When the applet app.class, with its associated classes, is first launched by the workstation 36, it attempts to download a file update.txt from the first directory in the server 32. If the file is absent, then a Boolean class is set in the class Constants.class, and the applet app.class knows not to try again. The Boolean class is set only when downloading is fully complete. Thus, if a page transfer, say from Page 1 to Page 2, is made while the download is in process, then the Boolean variable will not be set, and the applet app.class will repeat the download attempt when it is launched by Page 2. All intermediate variables involved in downloading update.txt are non-static, so that a re-attempt to download this file will not be disturbed by unwanted persistence.

Once downloading of the file update.txt is fully complete, then its data is transferred permanently to a static String variable in the class Constants.class, which is running on the workstation 36. JAVA String search functions are used to provide fast access to desired values. If Page A1, loaded from the server 32 and now residing on the workstation 36, contains an event handler which offers an item for sale, and the event handler is triggered by the operator of the workstation 36, and a database is present as a static String in the class Constants.class, then the call to method prod( ) in the applet app.class will include a check to see whether the ID that is present in the HTML event handler call from Page 1 is listed in the database String in the class Constants.class. If it is, then the database price in the String is used rather than the amount hard-wired into the event handler in Page 1.

Although the invention has been disclosed in terms of a number of preferred embodiments, and variations thereon, it will be understood that numerous additional modifications and variations could be made without departing from the scope of the invention as set forth in the following claims.

What is claimed is:

1. A method for generating persistence among a plurality of web pages comprising the steps of:
   a) providing a computing device including a memory, a browser application, and a software engine associated with said browser application;
   b) providing at least first and second codes that are employed to generate first and second web pages, respectively, each of said codes including a first and a second subset, said first code subset defining a program to be accessed and including identification information for said program, said program including a plurality of static variables that remain defined as long as said program remains loaded in said memory by said browser-associated software engine, each of said variables having a corresponding value, and said second code subset comprising program code that facilitates access and modification of said static variables with said browser-associated software engine through said web pages;
   c) loading said first code in said memory of said computing device;
   d) accessing said first code of said first web page with said browser application;
   e) executing said program with said browser-associated software engine;
   f) employing said browser-associated software engine facilitated by said second code subset to modify said static variables in said program;
   g) suspending said program without unloading said program from said memory by ceasing access of said first code of said first web page;
   h) loading said second code in said memory of said computing device;
   i) accessing said second code of said second web page with said browser application;
   j) employing said program identification information in said first code subset of said second code to reactivate said program with said browser-associated software engine using the values of said static variables as they were prior to said program being suspended; and
   k) employing said browser-associated software engine facilitated by said second code subset to access the values of said static variables in said program;
   whereby, said program performs a function with both said first and said second web pages.

2. The method of claim 1, wherein said program is selected from the group comprising a JAVA applet and an Active X object.

3. The method of claim 1, wherein at least some of said static variables comprise a database or a database cache.

4. The method of claim 1, wherein at least some of said static variables contain quantity and price information for one or more items selected for purchase from information provided in said first and second web pages.

5. The method of claim 1, wherein said program subset further includes at least one parameter that can be altered from one web page to another, without altering the identity of said program, whereby said program can be made to run differently, depending on the web page currently loaded in said memory.

6. The method of claim 1, wherein said first and second codes are loaded from a storage device selected from the group comprising a hard drive, a CD-ROM, a remotely located server and a local server.

7. The method of claim 1, wherein at least some of said plurality of static variables that remain defined as long as said first program remains loaded in said memory by said browser-associated software engine are used to generate an object that remains active as long as said first program remains loaded in said memory by said browser-associated software engine regardless of whether code that was loaded in said memory when said object was created continues to be loaded.

8. The method of claim 7, wherein said object is a graphical user interface that is displayed on a display associated with said computing device.

9. The method of claim 7, wherein said object is a visual object that is displayed on a display associated with said computing device.

10. The method of claim 7, wherein said object communicates with a database.

11. The method of claim 7, wherein said object is a database cache.

12. A computer device for accessing a program to be associated with a plurality of web pages comprising:
   a) a processor;
   b) an operating memory;
   c) a browser application; and
   d) a software application associated with said browser application,
   said processor being programmed with said a software engine to:
      1) load in said memory, a first of first and second codes that are employed to generate first and second web pages, respectively, each of said codes including a first and a second subset said first subset defining a program to be accessed and including identification information for said program, said program including a plurality of static variables that remain defined as long as said program remains loaded in said memory by said browser-associated software engine, each of said variables having a corresponding value; and said second subset comprising program code that facilitates access and modification of said static variables with said browser-associated software engine through said web pages;
      2) access said first code of said first web page with said browser application;
      3) execute said program with said browser-associated software engine;
      4) suspend said program without unloading said program from said memory by ceasing access of said first code of said first web page;
      5) load said second code in said memory;
      6) access said second code of said second web page with said browser application;
      7) employ said program identification information in said first code subset of said second code to reactivate said program using the values of said static variables as they were prior to said program being suspended; and
      8) employ said browser-associated software engine facilitated by said second code subset to access the values of said static variables in said program;
         whereby, said program performs a function with both said first and said second web pages.

13. The computer device of claim 12, wherein said program is selected from the group comprising a JAVA applet and an Active X object.

14. The computer device of claim 12, wherein at least some of said static variables comprise a database or a database cache.

15. The computer device of claim 12, wherein at least some of said static variables contain quantity and price information for one or more items selected for purchase from information provided in said first and second web pages.

16. The computer device of claim 12, wherein said first subset further includes at least one parameter that can be altered from one web page to another, without altering the identity of said program, whereby, said program can be made to run differently, depending on the web page currently loaded in said memory.

17. The computer device of claim 12, further including a storage device selected from the group comprising a hard drive, a CD-ROM, a remotely located server and a local server for storing said first and second codes before they are loaded into said operating memory.

18. The method of claim 12, wherein at least some of said plurality of static variables that remain defined as long as said first program remains loaded in said memory by said browser-associated software engine are used to generate an object that remains active as long as said first program remains loaded in said memory by said browser-associated software engine, regardless of whether code that was loaded in said memory when said object was created continues to be loaded.

19. The computer device of claim 18, wherein said object is a graphical user interface that is displayed on a display associated with said computing device.

20. The computer device of claim 18, wherein said object is a visual object that is displayed on a display associated with said computing device.

21. The computer device of claim 18, wherein said object communicates with a database.

22. The computer device of claim 18, wherein said object is a database cache.

23. The computer device of claim 18, wherein said object contains quantity and price information for one or more items selected for purchase from information provided in said first and second web pages.

* * * * *